(12) United States Patent
Poole et al.

(10) Patent No.: US 8,587,825 B2
(45) Date of Patent: Nov. 19, 2013

(54) ETHERNET AND USB POWERED PRINTERS AND METHODS FOR SUPPLYING ETHERNET AND USB POWER TO A PRINTER

(75) Inventors: David L. Poole, Palatine, IL (US);
Douglas A. Fox, Fox Point, WI (US);
Robert A. Ehrhardt, Jr., Palatine, IL (US); Eugene K. Brown, Simi Valley, CA (US); Rod DeMay, Woodland Hills, CA (US); John Ham, Agoura Hills, CA (US); Gary F. Lynch, Moorpark, CA (US); Donald V. Thielen, Camarillo, CA (US)

(73) Assignee: ZIH Corp, Lincolnshire, IL (US)

( * ) Notice: Subject to any disclaimer, the term of this patent is extended or adjusted under 35 U.S.C. 154(b) by 1399 days.

(21) Appl. No.: 11/336,089

(22) Filed: Jan. 20, 2006

(65) Prior Publication Data

US 2006/0164447 A1 Jul. 27, 2006

Related U.S. Application Data

(60) Provisional application No. 60/645,294, filed on Jan. 20, 2005.

(51) Int. Cl.
*G06F 15/00* (2006.01)
*G06K 1/00* (2006.01)

(52) U.S. Cl.
USPC .............. 358/1.9; 358/1.2; 358/1.5; 358/3.09

(58) Field of Classification Search
USPC ................. 710/62; 358/1.2, 1.5, 1.9, 3.09
See application file for complete search history.

(56) References Cited

U.S. PATENT DOCUMENTS 4,389,935 A * 6/1983 Arai ............................ 101/93.01
4,991,113 A * 2/1991 Kurokawa ...................... 358/1.9

(Continued)

FOREIGN PATENT DOCUMENTS

EP 1 675 313 A2 6/2006
JP 2007-148781 6/2007

OTHER PUBLICATIONS

PoweredUSB Electro/Mechanical 050121 (0.8g); "Retail USB USB PlusPower USB +Power", pp. 1-33, 2005.

(Continued)

*Primary Examiner* — Farley Abad
(74) *Attorney, Agent, or Firm* — Alston & Bird LLP

(57) ABSTRACT

Ethernet and Universal Serial Bus (USB) powered printing devices are provided. In particular, Ethernet and USB powered printers and methods of Ethernet powering of printers that support high speed printing and/or data intensive printing. Such high-speed and/or data intensive printing operations are able to be Ethernet or USB powered by providing for a power storage unit within the printer device that is able be charged during non-printing periods and provide for necessary energy bursts to support such higher powered processes. In addition, the present invention provides for devices and methods that allow for printers to operate with main power provided by conventional power mains and for back-up or secondary power to be supplied by Ethernet or USB power. Additionally, the invention provides for Ethernet or USB powering, both primary and back-up, of the data and configuration settings in the printer control and image generating electronics. In the back-up power mode, the Ethernet or USB power insures that data and configurations are not lost during periods of main power outage. The invention also provides a printer and method that can optimize a printing operation, e.g., by adjusting the speed of the printing operation according to the power required for the operation and/or the power available.

50 Claims, 9 Drawing Sheets

(56) References Cited

U.S. PATENT DOCUMENTS

| | | | |
|---|---|---|---|
| 5,032,819 A | 7/1991 | Sakuragi et al. | |
| 5,051,720 A | 9/1991 | Kittirutsunetorn | |
| 5,326,183 A * | 7/1994 | Kasai et al. | 400/124.04 |
| 5,884,086 A * | 3/1999 | Amoni et al. | 713/300 |
| 5,890,819 A | 4/1999 | Compton | |
| 5,994,998 A | 11/1999 | Fisher et al. | |
| 6,115,468 A | 9/2000 | De Nicolo | |
| 6,218,930 B1 | 4/2001 | Katzenberg et al. | |
| 6,225,708 B1 * | 5/2001 | Furukawa et al. | 307/66 |
| 6,373,377 B1 | 4/2002 | Sacca et al. | |
| 6,448,899 B1 | 9/2002 | Thompson | |
| 6,450,712 B1 * | 9/2002 | Shah et al. | 400/582 |
| 6,465,987 B1 * | 10/2002 | Haas et al. | 320/128 |
| 6,535,983 B1 | 3/2003 | McCormack et al. | |
| 6,559,757 B1 | 5/2003 | Deller et al. | |
| 6,591,073 B1 * | 7/2003 | Fujii | 399/88 |
| 6,640,308 B1 | 10/2003 | Keyghobad et al. | |
| 6,714,977 B1 | 3/2004 | Fowler et al. | |
| 6,779,862 B2 * | 8/2004 | Elgee | 347/14 |
| 6,996,458 B2 | 2/2006 | Pincu et al. | |
| 7,017,055 B1 * | 3/2006 | Ho | 713/300 |
| 7,024,569 B1 * | 4/2006 | Wright et al. | 713/300 |
| 7,383,448 B2 | 6/2008 | Kohara | |
| 7,567,579 B2 | 7/2009 | Korcharz et al. | |
| 7,706,392 B2 | 4/2010 | Ghoshal et al. | |
| 2002/0021209 A1 | 2/2002 | Fisher et al. | |
| 2002/0037054 A1 | 3/2002 | Schurig | |
| 2003/0036819 A1 | 2/2003 | Lehr et al. | |
| 2003/0058085 A1 | 3/2003 | Fisher et al. | |
| 2003/0062991 A1 | 4/2003 | Fisher et al. | |
| 2003/0142515 A1 * | 7/2003 | Kim et al. | 363/21.15 |
| 2004/0025066 A1 | 2/2004 | Jackson et al. | |
| 2004/0049321 A1 * | 3/2004 | Lehr et al. | 700/286 |
| 2004/0068535 A1 | 4/2004 | Subbiah et al. | |
| 2004/0073597 A1 | 4/2004 | Caveney et al. | |
| 2005/0128236 A1 * | 6/2005 | Fukasaka | 347/16 |
| 2005/0201301 A1 * | 9/2005 | Bridgelall | 370/254 |
| 2005/0286275 A1 * | 12/2005 | Ryu | 363/45 |
| 2009/0265563 A1 | 10/2009 | Camagna et al. | |

OTHER PUBLICATIONS

"What is PoweredUSB?", PoweredUSB.org; 3 pages; http://www.poweredusb.org/whatispusb.html.

"802.3af", *NetWorkWorld*, 5 pages; http://www.networkworld.com/details/4681.html.

"802.3af powers up LAN, lowers cost," *NetWorkWorld*, 2 pages; http://networkworld.com/news/tech/2003/0310tech.html.

Norford, L. K., et al.; "Near-Term Technology Review of Electronic Office Equipment"; Industry Applications Society Annual Meeting; Oct. 2, 1993; Conference Record of the 1993 IEEE; pp. 1355-1362.

Webber, C.A., et al.; "After-hours power status of office equipment in the USA"; Energy Analysis Department, Environmental Energy Technologies Division, Lawrence Berkeley National Laboratory, MS 90-4000, 1 Cyclotron Road, Berkeley, CA 94720, USA; Apr. 13, 2005.

\* cited by examiner

TO POWER CONVERTER 90
AND/OR PRINTER CONTROL
AND IMAGE GENERATING
CIRCUITRY 40

ETHERNET AND USB POWERED PRINTERS AND METHODS FOR SUPPLYING ETHERNET AND USB POWER TO A PRINTER

CROSS-REFERENCE TO RELATED APPLICATIONS

This application claims the benefit of U.S. Provisional Patent Application No. 60/645,294, filed Jan. 20, 2005, which is incorporated herein in its entirety by reference.

FIELD OF THE INVENTION

The present invention relates to printers and, more specifically to devices and methods that provide for power to be supplied to a printer from a powered interface, such as an Ethernet network communication transmission line or a Universal Serial Bus, and/or to optimize a printing operation according to the power required for the operation.

BACKGROUND OF THE INVENTION

Local area networks (LANs) have grown tremendously in the last few years and, leading the way in the growth of LANs is the Ethernet type LAN. Ethernet was first developed in the mid 1970's. By the early 1980's, the Institute of Electrical and Electronic Engineers (IEEE) developed a standard for Ethernet designated as IEEE 802.3, which has been universally adopted by the network industry. From the early 1980's until the present, the IEEE 802.3 standard has undergone many revisions, including the addition of new features such as switched Ethernet, Fast Ethernet, Gigabit Ethernet and the like. Recently, the IEEE has adopted a new addition to the IEEE 802.3 standard, 802.3af, related to the transmitting of power over Ethernet transmission lines.

Specifically, the 802.3af addition, referred to commonly as "Power over Ethernet", involves delivering 48 volts of AC power over unshielded twisted-pair wiring. Power over Ethernet provides for power to be supplied over existing Ethernet infrastructure; i.e., existing cable, horizontal and patch cables, patch-panels, outlets; and connecting hardware are implemented.

Traditionally, network devices, such as IP phones, wireless LAN access points, laptop computers and the like, have required both an Ethernet connection and an AC electrical connection. Given the increasing number of LAN devices in corporations, wiring AC connections for each of them is a costly task. The 802.3af specification eliminates the need for additional outlets and the labor cost incurred from contracting electricians to install them.

Additionally, Power over Ethernet technology supports a point-to-multipoint power distribution architecture, parallel to the data network. This functionality allows network managers to implement a single uninterruptible power supply (UPS) at the network core to back up multiple scattered devices on the LAN.

Power over Ethernet provides for the power to be carried on two wire pairs, to comply with safety standards and existing cable limitations. 802.3af power sourcing equipment contains a detection mechanism to prevent sending power to noncompliant devices. Only terminals that present an authenticated Power over Ethernet signature will receive power, preventing damage to other equipment.

The 802.3af specification defines the current delivered to each node in the network as limited to 350 milliamps. The total amount of continuous power that can be delivered to each node, taking into account power loss over the cable, is 12.95 watts. For typical networked devices, such as IP telephones or wireless LAN access points, this is sufficient power because these types of devices consume between 3 and 10 watts of power.

However, other devices, and specifically LAN printers, typically require higher power. For example, LAN printers require additional power to be able to print at high speeds and/or to print images having extensive data. In this instance the total amount of continuous power that is supplied to the printer by the Ethernet connection is insufficient to support high speed printer and/or printing of data intensive materials.

Additionally, other networked devices, specifically LAN printers, typically rely on conventional AC electrical connections as a means of supplying power. However, outages in the AC electrical power routinely occur and interrupt the printing process. In addition to impeding the print process, power outages may cause the loss of data and configurations in the printer control and image generating electronics. The loss of such data and configurations means that once the AC electrical power is restored, the printing process can not resume until the data and configurations are reset in the printer control and image generating electronic. Such resetting of data and configurations further delays printings; thus, adding unnecessary inefficiency to the printing operation.

Some computer peripheral devices, which can be networked or non-networked, are configured to be powered via a Universal Serial Bus (USB), by which the devices can also receive commands or other communications. Standard USB (e.g., the USB 1.1 and USB 2.0 protocols) can be used to power devices but generally provides only low power, typically a maximum power of about 2.5 watts. Devices that require more than about 2.5 watts during operation, such as typical printers, are therefore not powered by standard USB. Instead, such devices are powered by a separate power supply or are configured for a different USB protocol such as powered USB (or "USB PlusPower"), which can typically provide no more than about 48 watts continuously (at 24 volts DC) per connector. A separate power supply typically requires a conventional AC electrical connection, which is subject to possible outages as described above. While a powered USB connection may avoid reliance on a separate conventional AC electrical connection, a powered USB connection may be unavailable in some cases, e.g., where the device is to be connected to a computer that does not have an available powered USB connection.

Therefore a need exists to develop LAN printers, specifically Ethernet LAN printers that are able to benefit from Power over Ethernet specifications, and/or printers that can benefit from power provided via other powered interfaces such as a Universal Serial Bus. The desired printers and methods should provide for adequate power to be supplied to the printer to support high speed printing and/or the printing of data intensive materials. Additionally, the desired printers and methods should provide for interface power such as Ethernet or USB power to sustain printing operations in instances in which outages occur in the main AC electrical connection. In addition to providing back-up power for the print operations, the interface power should provide back-up power to the data and configuration settings in the printer control and image generating electronics, insuring that such information is not lost during an AC power outage. Further, the printers should be adaptable for controlling a printing operation according to the power required for the operation, where the power is supplied by a powered interface or by another power supply.

BRIEF DESCRIPTION OF THE DRAWINGS

Figure 1:
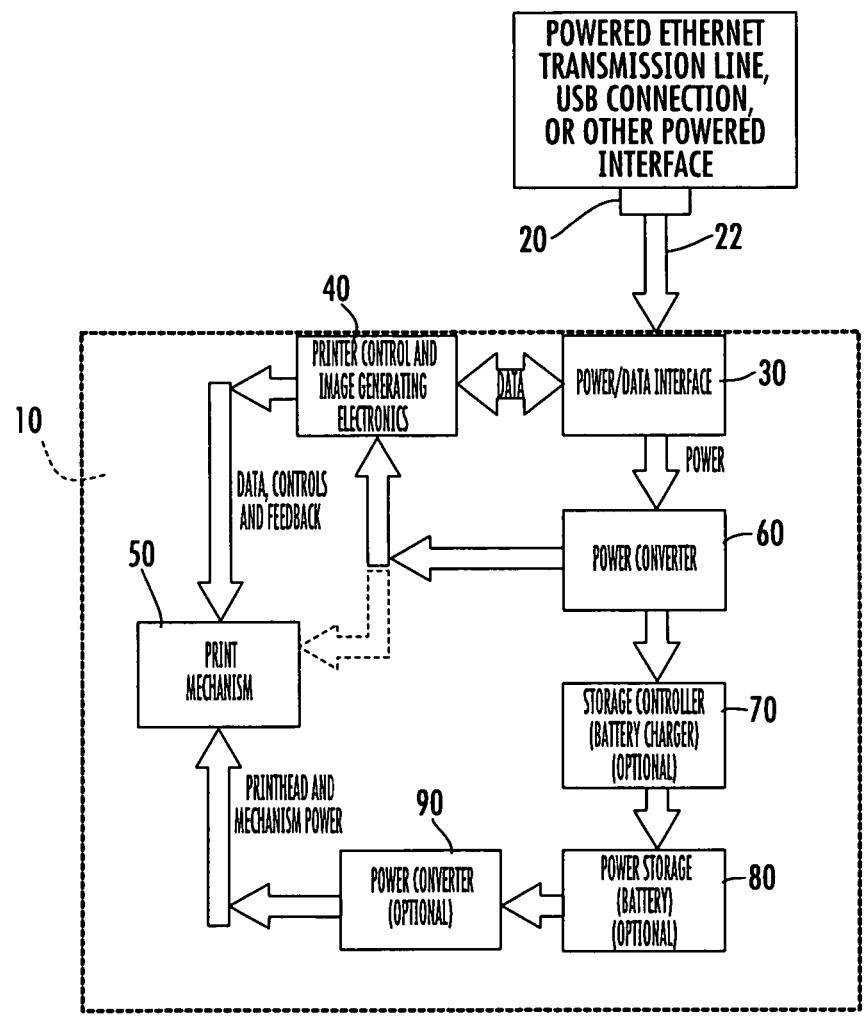

Having thus described the invention in general terms, reference will now be made to the accompanying drawings, which are not necessarily drawn to scale, and wherein:

FIG. 1 is a block diagram of an interface powered printer device, in accordance with an embodiment of the present invention.

Figure 2:
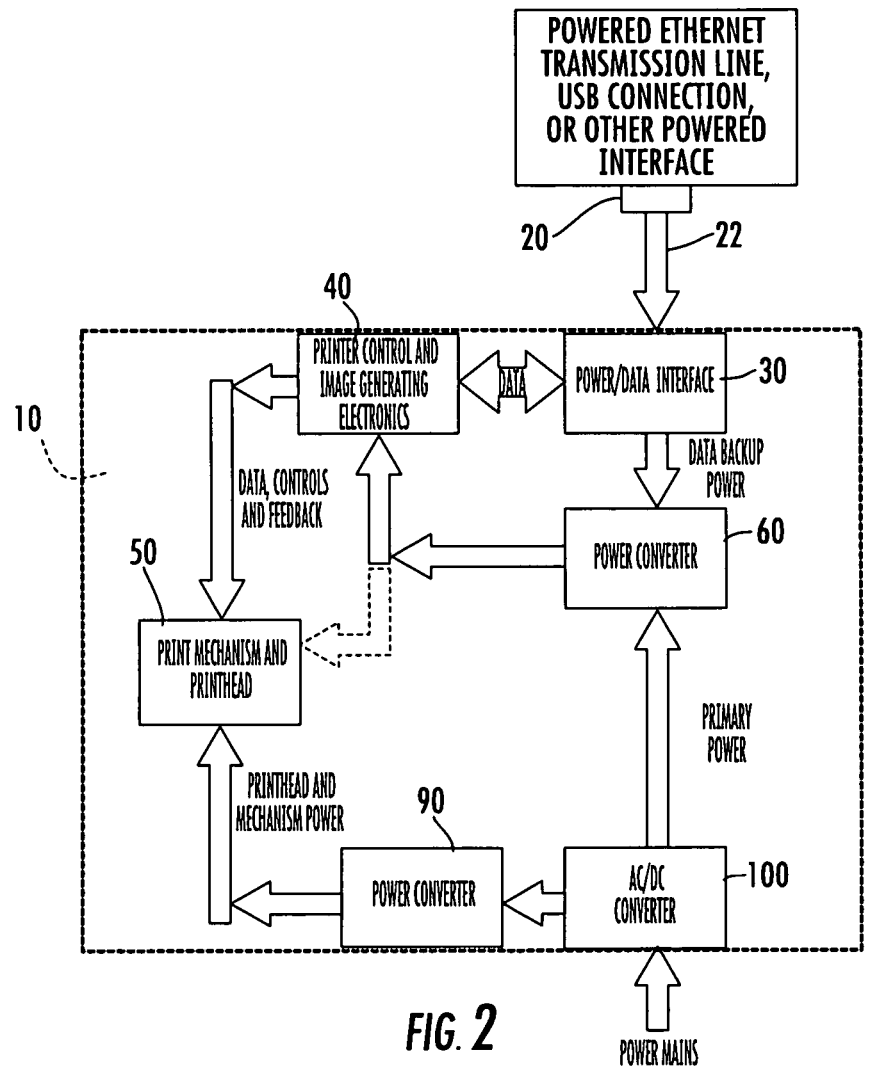

FIG. 2 is a block diagram of an alternate interface powered printer device, in accordance with an embodiment of the present invention.

Figure 3:
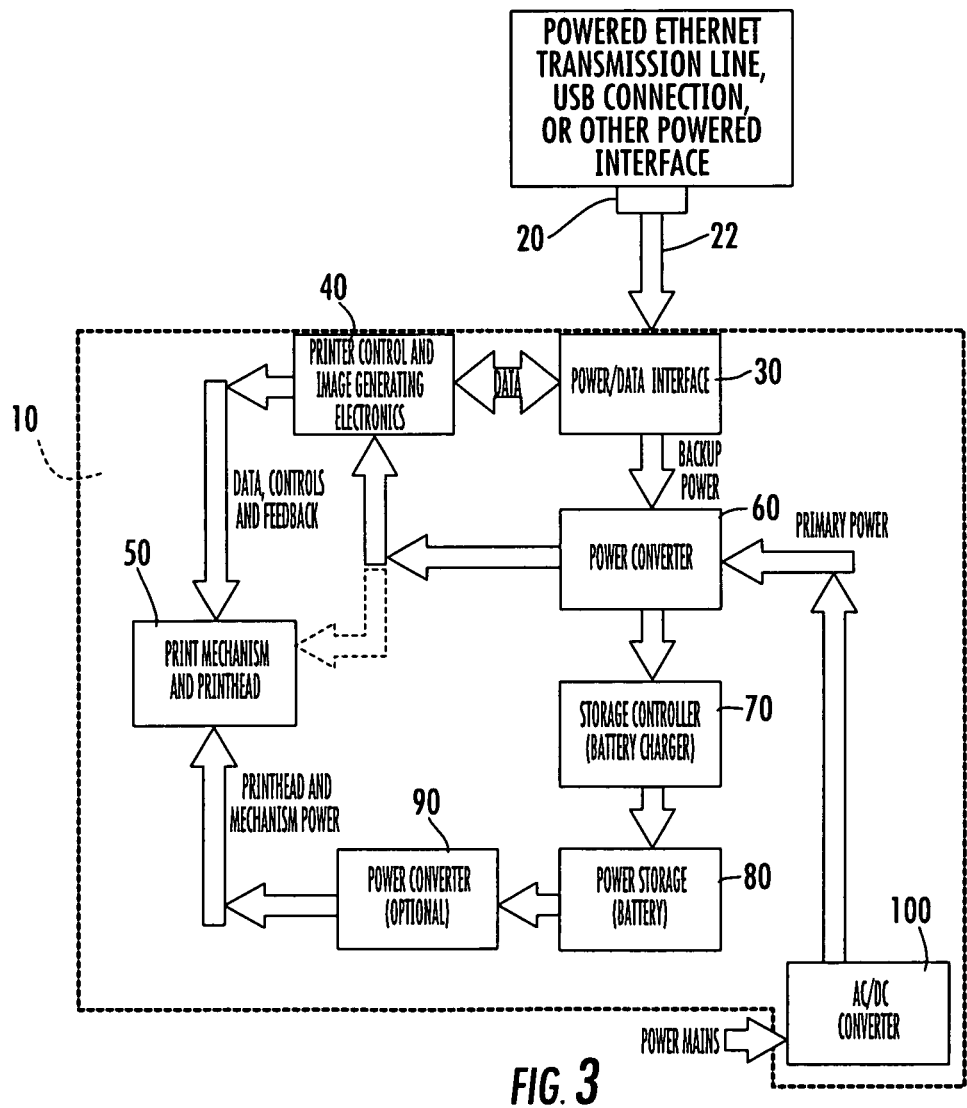

FIG. 3 is a block diagram of yet another interface powered printer device, in accordance with an embodiment of the present invention.

Figure 4:
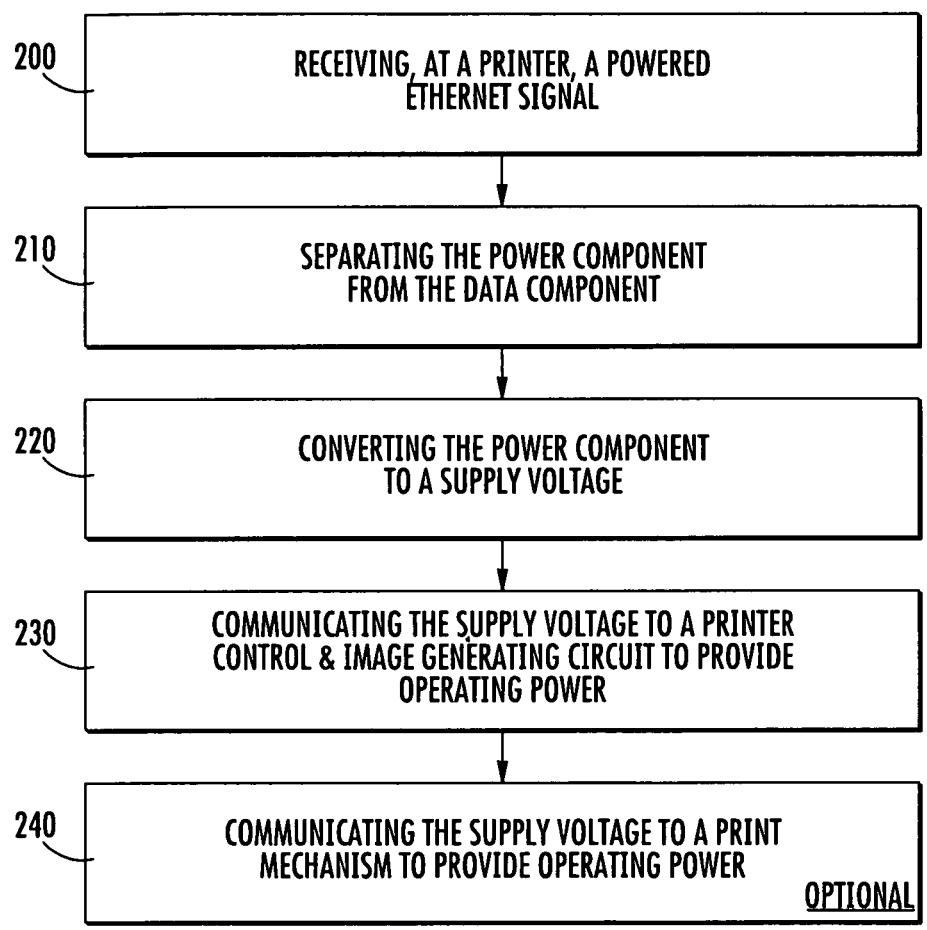

FIG. 4 a flow diagram of a method for providing Ethernet power to a printer device, in accordance with an embodiment of the present invention.

Figure 4A:
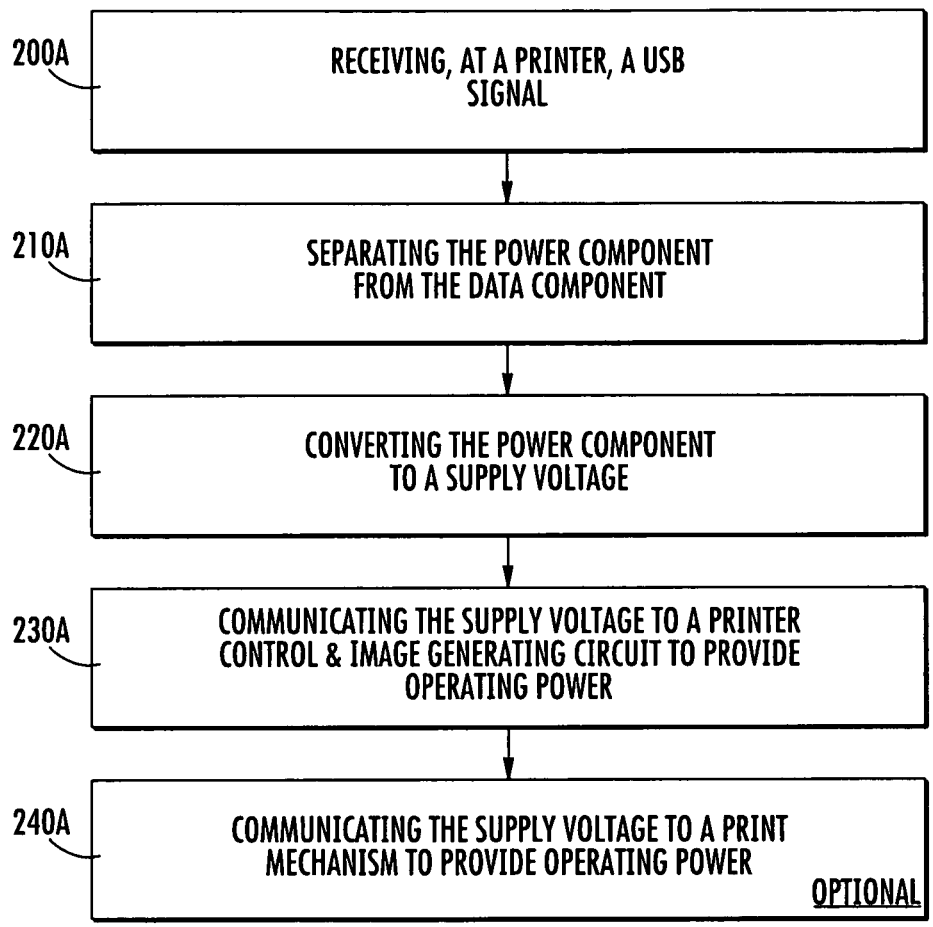

FIG. 4A a flow diagram of a method for providing USB power to a printer device, in accordance with an embodiment of the present invention.

Figure 5:
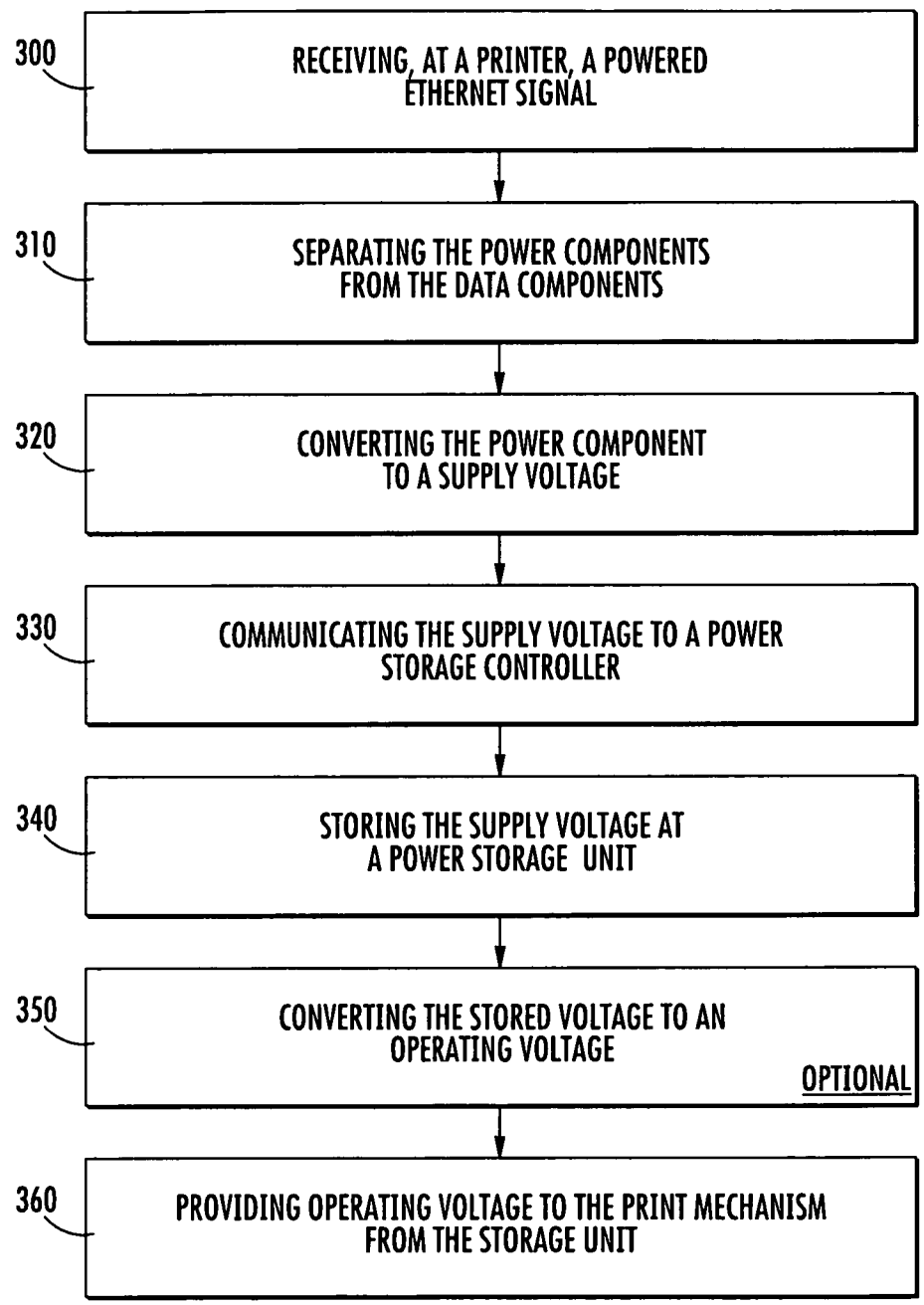

FIG. 5 is flow diagram of an alternate method for providing Ethernet power to a printer device, in accordance with an embodiment of the present invention.

Figure 5A:
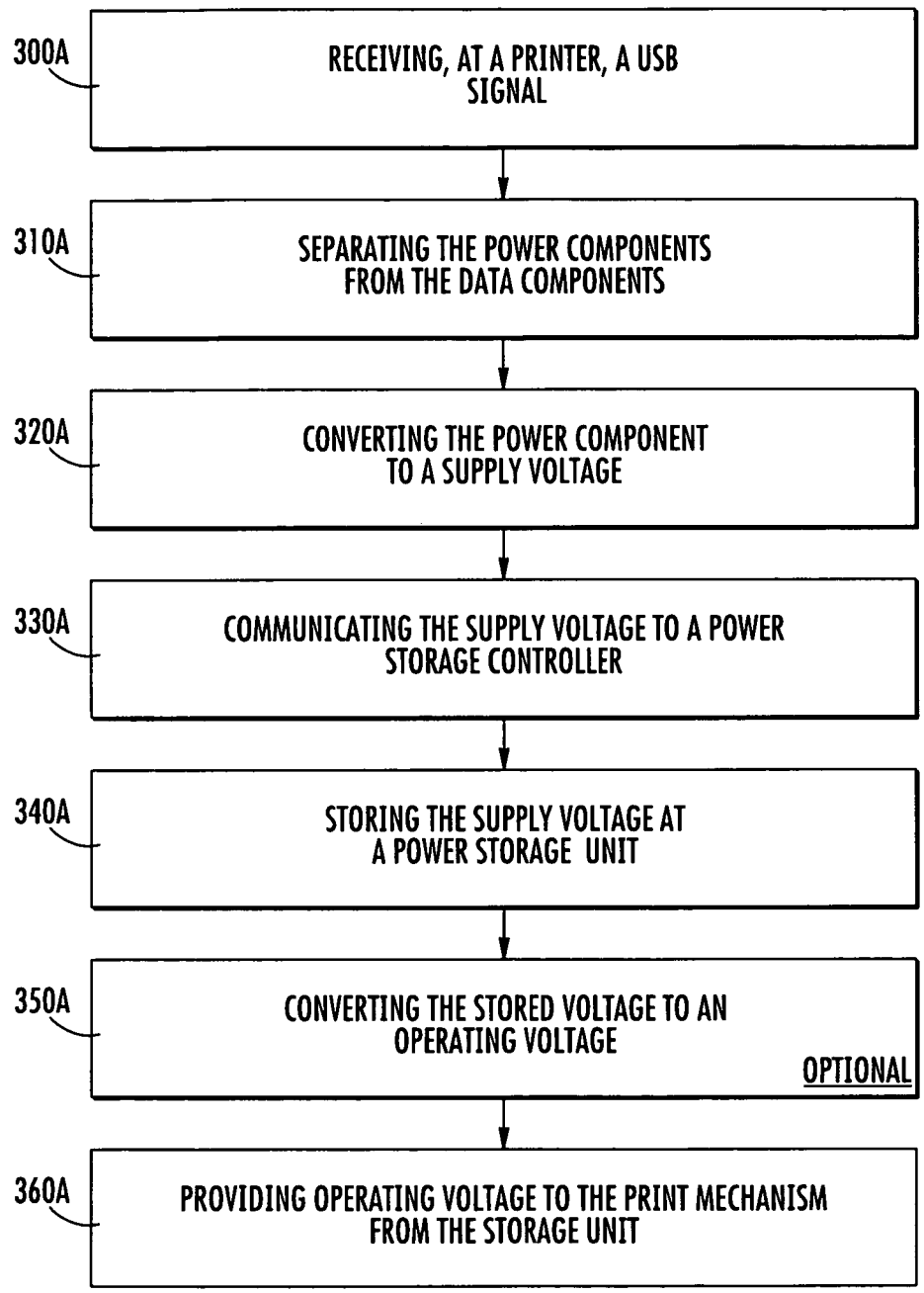

FIG. 5A is flow diagram of an alternate method for providing USB power to a printer device, in accordance with an embodiment of the present invention.

Figure 6:
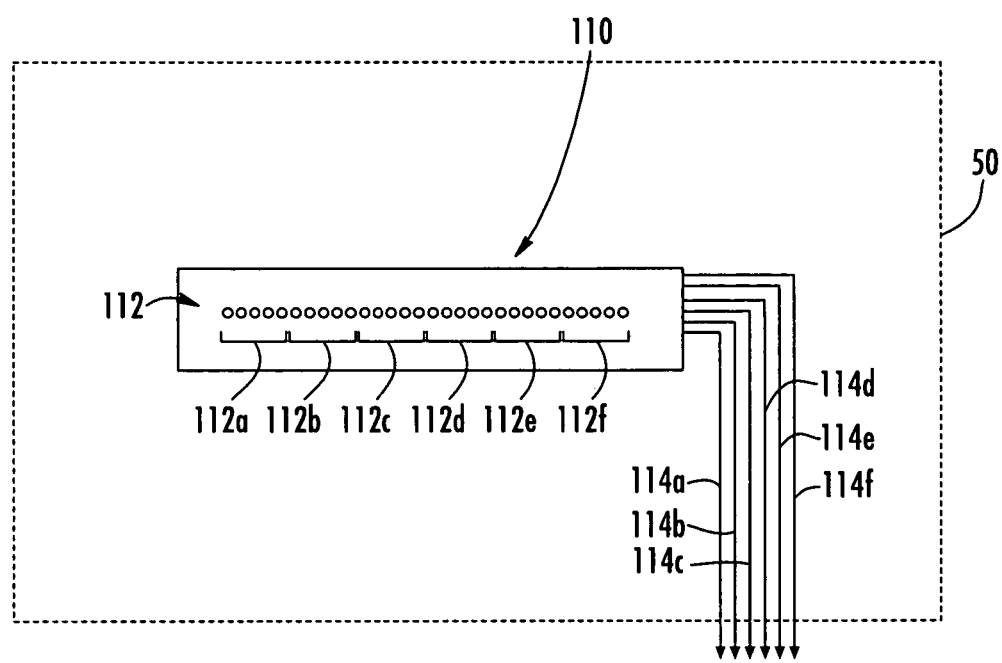

FIG. 6 is a block diagram of a printhead of an Ethernet or USB powered printer device, in accordance with another embodiment of the present invention.

Figure 7:
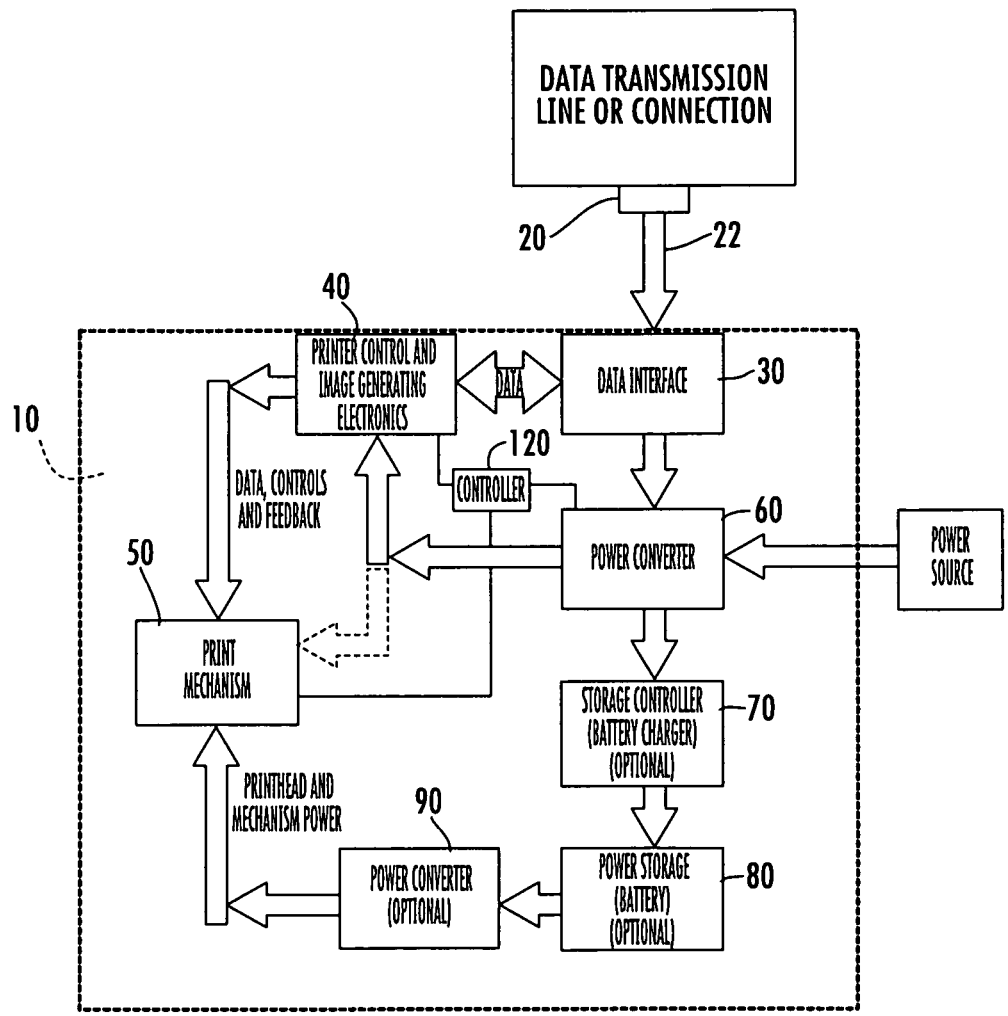

FIG. 7 is a block diagram of a printer device having a controller configured to adjust the speed of the printer according to the power required for a printing operation, in accordance with another embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for interface powered printing devices. In particular, the present invention provides for interface powered printers and methods of providing interface power to printers. For example, the printers can be powered by an Ethernet, Universal Serial Bus (USB), or other powered interfaces. While Ethernet and USB interfaces are described throughout this application, it is understood that other powered interfaces can also be used, including some interfaces that have not been developed at this time, such as powered IEEE1284 (parallel) or powered Firewire interfaces.

The methods and devices support high speed printing and/or data intensive printing. Such high-speed and/or data intensive printing operations can be Ethernet or USB powered by providing for an energy or power storage unit within the printer device that is able to provide for necessary energy bursts to support such higher powered processes. In addition, the present invention provides for devices and methods that allow for printers to operate with primary power provided by conventional power mains and for back-up or secondary power to be supplied by Ethernet or USB power. Additionally, the invention provides for Ethernet or USB powering, both primary and back-up, of the data and configuration settings in the printer control and image generating electronics. In the back-up power mode, the Ethernet or USB power insures that data and configurations are not lost during periods of main power outage.

An embodiment of the present invention is defined by a printing device capable of obtaining power from an Ethernet network transmission line or a USB connection. The device includes a power and data interface in communication with a powered Ethernet communication port or USB communication port that separates the data transmission in the Ethernet or USB communication from the power transmission, a power converter in communication with the power and data interface, a printer control and image generating circuit in data communication with the interface and in electrical communication with the power converter, and a print mechanism in data communication with the printer control and image generating circuit that receives print control and image data from the circuit. In operation the power converter receives the power transmission from the interface and converts the signal to a supply voltage, which in turn is provided to the print control and image generating circuit. The power that is supplied to the print control and image generating circuit from the Ethernet network transmission line or USB connection may be the primary electrical source or it may provide for the back-up electrical source.

In specific embodiments the power converter may be in direct electrical communication with the print mechanism and printhead, collectively referred to herein as the print mechanism. Typically, since the amount of direct power from the Ethernet or USB supply source is limited, direct electrical connection between the power converter and the print mechanism is limited to printers having low print speeds and limited print data. In such embodiments the power that is supplied to the print mechanism from the Ethernet network transmission line or USB connection may be the primary electrical source or it may provide for the back-up electrical source.

Additionally, the printing device described above may include an energy storage unit in electrical communication with the print mechanism and an energy storage controller in electrical communication with the power converter and the energy storage unit. The energy storage unit and associated controller is typically required if the print mechanism performs high speed and/or data intensive printing and Ethernet or USB powering of the print operation is desired. The energy storage controller acts as an energy storage unit charger, in that, it receives supply voltage from the power converter and provides the supply voltage to the energy storage unit. In operation, the energy storage unit, typically a battery or the like, generally is charged during non-printing periods and provides for energy bursts necessary to provide power to the print mechanism. In embodiments of the invention in which an energy storage unit and associated storage controller are present to provide power to the print mechanism, the power that is supplied to the print mechanism may come primarily from the energy storage unit or the energy storage unit may be relied upon for back-up power. In embodiments having an energy storage unit and associated controller it may be necessary to include an additional power converter that is in electrical communication with the energy storage unit and the print mechanism. The additional power converter may be required to convert the energy storage voltage to the necessary print mechanism operating voltage. Alternatively, it may be possible to forego the additional power converter in embodiments in which the primary power converter is compatible with the requirements of the print mechanism.

In addition, the printing device described above may include an Alternating Current-Direct Current (AC-DC) converter that is in electrical communication with an electrical transmission line and the power converter. In such embodiments, the electrical transmission line (i.e., the power mains), typically provides the primary power to the printer control and image generating circuitry and/or the printing mechanism. In one specific embodiment the electrical transmission line provides the only power source for the print mechanism and the primary power source for the printer control and image generating circuitry, with the Ethernet or USB supplied power acting as the back-up power for the printer control and image generating circuitry. In embodiments having an AC-DC converter it may be necessary to include an additional power converter that is in electrical communication with the AC-DC converter and the print mechanism. The additional power converter may be required to convert the AC-DC converter voltage to the necessary print mechanism operating voltage. Alternatively, it may be possible to forego the additional power converter in embodiments in which the primary power converter is compatible with the requirements of the print mechanism.

Another embodiment of the present invention is defined by a printing device capable of obtaining power from an Ethernet network transmission line or USB connection. In this embodiment the printing device includes a power and data interface in communication with a powered Ethernet or USB communication port that separates data transmission from power transmission, a power converter in communication with the power and data interface, an energy storage controller in electrical communication with the first power converter, a power storage unit in electrical communication with the energy storage controller, and a print mechanism in electrical communication with the energy storage unit that receives electrical power from the energy storage unit. As such, the print mechanism may be solely powered by the voltage supplied from the energy storage unit or the voltage supplied by the energy storage unit may serve as back-up power for the print mechanism.

The printing device of this alternate embodiment may also include an additional power converter that is in electrical communication with the energy storage unit and the print mechanism. The additional power converter may be required to convert the energy storage voltage to the necessary print mechanism operating voltage. Alternatively, it may be possible to forego the additional power converter in embodiments in which the primary power converter is compatible with the requirements of the print mechanism.

Additionally, the device may include an optional printer control and image generating circuit in data communication with the interface and in electrical communication with the power converter. In such embodiments the circuit may be powered directly from the Ethernet powered transmission line or USB connection, from the energy storage unit or from a conventional AC electrical transmission line.

The invention is also embodied in a printing device capable of obtaining power from an Ethernet network transmission line or USB connection. In this alternate embodiment the printing device includes a power and data interface in communication with a powered Ethernet or USB communication port that separates data transmission from power transmission, a first power converter in communication with the power and data interface and a printer control and image generating circuit in data communication with the interface and in electrical communication with the power converter. The device also includes an AC-DC converter in electrical communication with an electrical transmission line and in electrical communication with the first power converter and a print mechanism in data communication with the printer control and image generating circuit and in electrical communication with the AC-DC converter. In this embodiment the electrical transmission line typically provides the primary power to the printer control and image generating circuitry, and the Ethernet network transmission line or USB connection typically provides secondary power to the printer control and image generating circuitry. Additionally, the printer device of this embodiment may include an additional power converter in electrical communication with the AC-DC converter and the print mechanism. Similar to the additional power converter in the previously described embodiments, the additional power converter may be required to convert the energy storage voltage to the necessary print mechanism operating voltage. Alternatively, it may be possible to forego the additional power converter in embodiments in which the primary power converter is compatible with the requirements of the print mechanism.

The invention is also embodied in various methods for providing Ethernet or USB power to at least a portion of a printer device. One method includes the steps of receiving, at a printer device, an Ethernet network signal or USB signal having a voltage component, converting the voltage component of the Ethernet network signal or USB signal to a supply voltage, and providing operating power to a printer control and image generating circuit in the form of the supply voltage. The method may additionally include the step of segregating the voltage component from a data component of the Ethernet network signal or USB signal. The step of providing operating power to a printer control and image generating circuit in the form of the supply voltage may further be defined as providing the sole operating power to the circuit or it may be defined as providing back-up power to the circuit. The method may also include the step of providing operating power to a print mechanism in the form of the supply voltage. The step of providing operating power to the print mechanism in the form of the supply voltage may further be defined as providing the sole operating power to the print mechanism or it may be defined as providing back-up power to the print mechanism.

In an alternate embodiment, a method for providing Ethernet or USB power to at least a portion of a printer device is defined. The method includes the steps of receiving, at a printer device, an Ethernet network signal or USB signal having a voltage component, converting the voltage component of the Ethernet network signal or USB signal to a supply voltage, providing the supply voltage to an energy storage controller, storing the supply voltage at an energy storage unit, and providing operating power to a print mechanism in the form of supply voltage stored at the energy storage unit. The step of providing operating power to a print mechanism in the form of supply voltage stored at the energy storage unit may further including providing sole operating power to the print mechanism in the form of supply voltage stored at the energy storage unit or providing back-up operating power to the print mechanism in the form of supply voltage stored at the energy storage unit. As such the present invention provides for novel printing devices and methods for providing power to a printer using Ethernet or USB power. In particular, the methods and devices support high speed printing and/or data intensive printing by providing for an energy storage unit within the printer device that is able to provide for the necessary high powered energy bursts to support such higher powered processes. In addition, the present invention provides for devices and methods that allow for printers to operate with primary power provided by conventional power mains and for back-up or secondary power to be supplied by Ethernet or USB power. Additionally, the invention provides for Ethernet or USB powering, both primary and back-up, of the data and configuration settings in the printer control and image generating electronics. In the back-up power mode, the Ethernet or USB power insures that data and configurations are not lost during periods of main power outage. Thus, the present invention provides for alternate means of powering a networked printer and for means of providing back-up power to the printer during instances of power outages.

As such the present invention provides for novel printing devices and methods for providing power to a printer using Ethernet or USB power. In particular, the methods and devices support high speed printing and/or data intensive printing by providing for a power storage unit within the printer device that is able to provide for the necessary high powered energy bursts to support such higher powered processes. In addition, the present invention provides for devices and methods that allow for printers to operate with primary power provided by conventional power mains and for back-up or secondary power to be supplied by Ethernet or USB power. Additionally, the invention provides for Ethernet or USB powering, both primary and back-up, of the data and configuration settings in the printer control and image generating electronics. In the back-up power mode, the Ethernet or USB power insures that data and configurations are not lost during periods of main power outage. Thus, the present invention provides for alternate means of powering a networked printer and for means of providing back-up power to the printer during instances of power outages.

The present invention provides for Ethernet-powered or Universal Serial Bus (USB)-powered printing devices and methods for providing Ethernet or USB power to printing devices. Printing devices, such as thermal transfer (TT) printers, label printers and the like typically operate at high-speed and provide for data-intensive printing. As such, these printer devices require high power to operate. Current direct supply Ethernet power does not provide for sufficient power to operate such printing devices. Similarly, standard USB provides a maximum of about 2.5 watts, which is typically less than the maximum power required during operation of such devices. The present invention addresses this problem in one embodiment by implementing a power storage unit that stores requisite power, which is then supplied to the printing mechanism and printhead in high powered bursts. Additionally, since networked printers are provided print control and image generating data via an Ethernet connection, a need exists to insure that this data is maintained even in the event of a conventional power outage. Thus the present invention provides for printing devices and methods for providing back-up power, in the form of Ethernet power, to the print control circuitry and/or the printing mechanism.

FIG. 1 illustrates a block diagram of a printer device having interface power capabilities, such as Ethernet or USB power capabilities, in accordance with an embodiment of the present invention. In this embodiment of the invention, power to the print control circuitry and the print mechanism is supplied solely by the interface power, e.g., Ethernet or USB power. The printer device 10 can include any suitable printing device having an appropriate connection, such as an Ethernet network connection or USB connection. Typically, such printer devices include, but are not limited to, label printers, smart label printers, TT printers, and the like. The term "smart" can refer to a printer that is configured to use a page description language (PDL) such as Zebra Programming Language (ZPL) and/or a printer that can be adapted for printing and/or encoding RFID-equipped labels. The printer device includes an interface port, such as a powered Ethernet communication port or USB communication port 20 that is in communication with a transmission line, such as an Ethernet transmission line or a USB connection. In the case of an Ethernet powered device, the powered Ethernet port 20 can provide for an authenticated Power over Ethernet signature that informs the network that the printer device is equipped to receive power transmissions over the Ethernet line. Currently, the powered Ethernet port is compliant with IEEE standard 802.3af, which defines the requirements for Power over Ethernet. However, network standards may change in the future and therefore, compliance with the 802.3af standard may not be required to implement the devices and methods of the present invention. Similarly, in the case of other powered interfaces, the port 20 can provide for a signature that indicates that the printer device is equipped to receive power transmissions over the connection. In some cases, however, such a signature may not be required. For example, the current standard for powered USB ("USB PlusPower"), provides for a special connector that provides power transmission over dedicated wires rather than on the same wires as the signal, so a signature would typically not be required in that case.

The interface port shown in FIG. 1 is a powered Ethernet communication port or USB communication port 20 that is in communication with power and data interface 30. In the illustrated embodiment, the communication between the port and the interface is conducted via cable 22, typically a twisted pair cable that provides for power and data transmissions. However, other means of Ethernet or USB communication may be established between the port and the interface without departing from the inventive concepts herein disclosed. The power and data interface is responsible for separating the power and data components of the Ethernet or USB communication into respective components. The data component of the Ethernet or USB communication is communicated from the interface to the printer control and image generating circuitry 40, which is in data communication with the circuitry. The printer control and image generating circuitry uses the information provided via the Ethernet network or USB connection, as well as information provided by other sources, including the device user, the print image and the like, to provide requisite print data, controls and feedback to the print mechanism 50, which is in data communication with the circuitry. The print mechanism is assumed to include the printhead, which is not depicted in FIG. 1. An exemplary printhead is illustrated in FIG. 6.

The power component of the Ethernet or USB communication is communicated from the interface to power converter 60, which is in electrical communication with the interface. The power converter converts the power in the Ethernet or USB transmission to the requisite supply voltage for the printer control and image generating circuitry 40. Once converted the regulated voltage is communicated from the converter to the circuitry and supplies the power necessary to operate the print control and image generating circuitry. An Alternating Current-Direct Current (AC-DC) converter can be provided, e.g., in either the communication with power and data interface 30 or in the power converter 60 to convert the Ethernet power (typically 48 volts AC) to the power required by the printer (typically about 20-24 volts DC).

In addition to supplying the power to the circuitry, the power converter is also in electrical communication with power storage controller 70. The storage controller, otherwise commonly referred to as a battery charger, is in communication with power storage unit 80, otherwise commonly referred to as a battery. The storage controller is responsible for managing the voltage that is supplied to the power storage unit and, as such, provides voltage to the storage unit. The storage unit typically is charged during non-printing periods.

The power storage unit provides for accumulation of power, such that higher powered energy bursts can be communicated to the print mechanism 50 to support high speed printing and/or data-intensive printing. An additional optional power converter 90 may be implemented to convert the power storage voltage to the operating voltage of the print mechanism. In such embodiments, the optional power converter can be in electrical communication with the power storage unit 80 and the print mechanism 50. The additional power converter is not required if the print mechanism is capable of operating at power storage unit voltage. In an alternate embodiment, it may be possible to combine the functionality of power converter 60 and power converter 90 into a single power converter unit if the print mechanism requirements are compatible.

In an alternate embodiment, the storage controller 70 and the power storage unit 80 may be excluded if the direct power from the Ethernet or USB power transmission is sufficient to support the requirements of the printing process. Typically, the storage controller and power storage units are optional if the printing device is limited to low speed print operations and printing of images having limited data. In such embodiments, the print mechanism can be in direct electrical communication with a power converter, eliminating the need to accumulate and store power for higher powered print processing.

FIG. 2 illustrates a block diagram of a printer device having interface power capabilities, such as Ethernet or USB power capabilities, in accordance with an alternate embodiment of the present invention. In this embodiment of the invention, power to the print mechanism and primary power to the print control circuitry is supplied by conventional power mains and back-up power to the print control circuitry is supplied by the interface power, e.g., Ethernet or USB power. Similar to the FIG. 1 embodiment, the printer device 10 includes any suitable printing device having an appropriate interface connection, such as an Ethernet network connection or USB connection. Typically, such printer devices include, but are not limited to, label printers, smart label printers (i.e., printers configured to use a page description language (PDL) and/or printers adapted for printing and/or encoding RFID-equipped labels), TT printers, and the like. The printer device includes a powered interface port, such as a powered Ethernet communication port or USB communication port 20 that is in communication with an Ethernet transmission line or a USB connection.

The powered Ethernet communication port or USB communication port 20 is in communication with power and data interface 30. In the illustrated embodiment, the communication between the port and the interface is conducted via cable 22, typically a twisted pair cable that provides for power and data transmissions. However, other means of Ethernet or USB communication may be established between the port and the interface without departing from the inventive concepts herein disclosed. The power and data interface is responsible for separating the power and data components of the Ethernet or USB communication into respective components. The data component of the Ethernet or USB communication is communicated from the interface to the printer control and image generating circuitry 40, which is in data communication with the circuitry. The printer control and image generating circuitry uses the information provided via the Ethernet network or USB connection, as well as information provided by other sources, including the device user, the print image and the like, to provide requisite print data, controls and feedback to the print mechanism 50, which is in data communication with the circuitry.

The power component of the Ethernet or USB communication is communicated from the interface to power converter 60, which is in electrical communication with the interface. The power converter converts the power in the Ethernet or USB transmission to the requisite supply voltage for the printer control and image generating circuitry 40. This power can be-relied upon as back-up power in the instance in which a power outage occurs across the power mains transmission line.

The FIG. 2 embodiment of the invention also includes an Alternating Current-Direct Current (AC-DC) converter 100 that is in electrical communication with a power mains electrical transmission line. As previously noted in this embodiment of the invention the power mains is responsible for providing sole power to the print mechanism and primary power to the print control mechanism; use of Ethernet or USB power is limited to back-up power for the print control circuitry. The AC-DC converter receives the AC electrical signal from the power mains line and converts the signal to a direct current signal. The AC-DC converter is in electrical communication with power converters 60 and 90, such that the DC signal is converted to requisite operating voltages for print control circuitry 40 and the print mechanism 50, respectively. Alternatively, it may be possible to configure the printer device with a single power converter if the output voltage of the converter is compatible with both the print control circuitry and the print mechanism.

FIG. 3 illustrates a block diagram of a printer device having interface power capabilities, such as Ethernet or USB power capabilities, in accordance with an embodiment of the present invention. In this embodiment of the invention, primary power is supplied to the print control circuitry and the print mechanism via power mains and back-up power is supplied to the print control circuitry and the print mechanism via interface power, e.g., Ethernet or USB power. The printer device 10 includes any suitable printing device having an appropriate connection, such as an Ethernet network connection or USB connection. Similar to the FIGS. 1 and 2 embodiments, such printer devices include, but are not limited to, label printers, smart label printers (i.e., printers configured to use a page description language (PDL), TT printers, and the like. The printer device includes a powered communication port such as an Ethernet communication port or USB communication port 20 that is in communication with an Ethernet transmission line or USB connection.

The powered Ethernet communication port or USB communication port 20 is in communication with power and data interface 30. The power and data interface is responsible for separating the power and data components of the Ethernet or USB communication into respective components. The data component of the Ethernet or USB communication is communicated from the interface to the printer control and image generating circuitry 40, which is in data communication with the circuitry. The printer control and image generating circuitry uses the information provided via the Ethernet network or USB connection, as well as information provided by other sources, including the device user, the print image and the like, to provide requisite print data, controls and feedback to the print mechanism 50, which is in data communication with the circuitry.

The power component of the Ethernet or USB communication is communicated from the interface to power converter 60, which is in electrical communication with the interface. The power converter converts the power in the Ethernet or USB transmission to the requisite supply voltage for the printer control and image generating circuitry 40. This power can be relied upon as back-up power in the instance in which a power outage occurs across the power mains transmission line.

The FIG. 3 embodiment of the invention includes an Alternating Current-Direct Current (AC-DC) converter 100 that is in electrical communication with a power mains electrical transmission line. As previously noted in this embodiment of the invention the power mains is responsible for providing primary power to the print mechanism and the print control mechanism; use of Ethernet or USB power is limited to back-up power for the print control circuitry and the print mechanism. The AC-DC converter receives the AC electrical signal from the power mains line and converts the signal to a direct current signal. The AC-DC converter is in electrical communication with power converter 60, such that the DC signal is converted to requisite operating voltages for print control circuitry. Alternatively, although not depicted in FIG. 3, the AC-DC converter may be in direct electrical communication with power converter 90.

In addition to supplying the power to the circuitry, power converter 60 is also in electrical communication with power storage controller 70. The storage controller, otherwise commonly referred to as a battery charger, is in communication with power storage unit 80, otherwise commonly referred to as a battery. The storage controller is responsible for managing the voltage that is supplied to the power storage unit and, as such, provides voltage to the storage unit. The storage unit typically is charged during non-printing periods. The power storage unit provides for accumulation of power, such that higher powered energy bursts can be communicated to the print mechanism 50 to support high speed printing and/or data-intensive printing. An additional optional power converter 90 may be implemented to convert the power storage voltage to the operating voltage of the print mechanism. In such embodiments, the optional power converter can be in electrical communication with the power storage unit 80 and the print mechanism 50. The additional power converter is not required if the print mechanism is capable of operating at power storage unit voltage. In an alternate embodiment, it may be possible for power converter 60 to convert power for the power storage unit if the print mechanism voltage requirements are compatible with the output voltage of power converter 60.

For example, if the power and data interface 30 is connected to a USB communication port 20, the power and data interface separates the power and data components of the USB communication into respective components. The data component of the USB communication is communicated from the interface to the printer control and image generating circuitry 40, and the data component is used to provide print data, controls and feedback to the print mechanism 50. The power component of the USB communication is communicated from the interface 30 to power converter 60, which converts the power in the USB transmission to the requisite supply voltage for the printer control and image generating circuitry 40. Power that is not used for printing can instead be delivered via the power storage controller 70 to the power storage unit 80. For example, during non-printing periods or other periods of low power demand, the power storage unit 80 can be charged. The energy stored in the unit 80 can be supplied for printing as necessary, e.g., if the power required for a printing operation exceeds the power available from the power converter 60.

Further, the circuitry 40 (or other circuitry) can restrict the printing operation according to the power that is available from the power converter 60 and/or the power storage unit 80. For example, the circuitry 40 can continuously monitor the state of the power converter 60 and the power storage unit 80 to determine the total power available for a printing operation and limit the operation of the printer accordingly. Thus, e.g., if the total power available from the power converter 60 and the power storage unit 80 is insufficient for operating the print mechanism 50 above a particular determined speed, the circuitry 40 can limit the operation of the print mechanism 50 to a speed less than the particular determined speed. Similarly, other restrictions can be imposed on the printing operation according to the available power, such as a restriction on printing features. If the total power available from the power converter 60 and the power storage unit 80 is greater than the power required for the present operation of the printer, unrestricted operation of the printer can be enabled.

If the USB communication port 20 connected to the power and data interface 30 is a low voltage USB, such as a USB 1.1 or USB 2.0 connection that provides a maximum power of about 2.5 watts, the power received from the USB may be insufficient for continuously operating the printer. However, the power can be used to partially power the printing operation, i.e., by supplementing another power source. Also, energy received from the USB port 20 can be stored and delivered at a different time and/or power. In particular, if the power and data interface 30 receives a continuous supply of energy at a relatively low power from the USB port, the energy can be stored in the power storage unit 80 and delivered at a greater voltage and/or current during intermittent periods of printing. Thus, the power storage unit 80 can be configured to provide power to the print mechanism 50 at a power level that is greater than the maximum power level of the communication port 20. Therefore, the power from the USB port can be used for printing, even if the maximum power level of the USB port is a relatively low level, e.g., at about 2.5 watts or less, and the printer requires power at a higher level, e.g., above 2.5 watts (in some cases, above 5 watts or, in other cases, above 10 watts), during some periods of operation. While the power and data interface 30 receives power from a USB connection in the foregoing example, a powered Ethernet transmission line can instead be provided for powering the printer device 10.

In some cases, the printer can determine the power that will be required for performing certain printing operations and adjust the speed or other operational parameters of the printer accordingly. For example, the printer control and image generating circuitry 40 (or other circuitry of the printer) can determine the print density requirements according to the data component of the Ethernet or USB communication that is communicated from the interface 30 or according to the print data that is provided by the circuitry 40 in response to the data component of the Ethernet or USB communication. The print density requirements, which indicate the required density of the printing that is to be performed, can be determined by the number of dots or printhead elements that are to be activated per line and the darkness setting for an upcoming print operation. The print density requirements and the print speed are at least partially indicative of the power requirements for conducting a particular printing operation. That is, greater print density generally requires greater power, and faster printing speed generally requires greater power. Thus, the power required for a printing operation can be determined, at least in part, by evaluating the print density requirements and printing speed. In some cases, the printer control and image generating circuitry 40 (or other circuitry of the printer) can determine the print density requirements and, hence, the power required for upcoming print operations, and adjust the speed of the printer accordingly.

For example, if the power required for printing a subsequent line of print exceeds the power available from the power converter 60 and/or the power storage unit 80 (if present), the printer control and image generating circuitry 40 can reduce the speed of the print mechanism 50 so that the required power is less than or equal to than that available from the power converter 60 and/or the power storage unit 80. Similarly, if the power available from the power converter 60 and/or the power storage unit 80 exceeds the power required for printing a subsequent line at the current speed, the printer control and image generating circuitry 40 can increase the speed of the print mechanism 50 to a desired speed, which can be predetermined by the printer or input by a user, thereby reducing the total time for a printing operation. If the printer is already operating at the desired speed, the operation can be continued at the desired speed if there is sufficient power available for doing so. In this way, the required power for printing can be limited to the power that is available, and/or the speed or other operation of the printer can be optimized.

This optimization of the printing power, speed, and other aspects of the printer operation can be performed regardless of the power source for powering the printer. That is, the printer can be configured to operate on Ethernet or USB power, as described above. Alternatively, the printer can be configured to operate on other power, such as by using a conventional power adapter that is connected to a conventional AC electrical outlet. For example, as illustrated in the embodiment of FIG. 7, the printer device 10 includes a power converter 60 that is a conventional power adapter that receives power from a conventional power source, i.e., an AC electrical outlet. Data is received via a data interface 30 that is connected by a cable 22 (or other connection, such as a wireless connection) to a port 20 of a data transmission line or other connection. The power converter 60 can be configured to provide power directly to the print mechanism 50, and/or a battery charger 70, battery 80, and power converter 90 can be provided so that the output of the power converter 60 can be stored before use. In either case, the printer can be configured to adjust the speed or other operation of the printer so that the available power from the converter 60 is not exceeded. For example, a controller 120 can be provided for controlling the printing operation, or the printer control and image generating circuitry 40 can perform the control operation. In this respect, the controller 120 or circuitry 40 can periodically determine, or continuously monitor, the power required for an upcoming operation of the print mechanism 50, e.g., according to the print density requirements determined by a data communication that is communicated from the interface 30 or according to the print data that is provided by the circuitry 40 in response to the data communication. Based on the power required for performing the printing operation, the controller 120 or circuitry 40 can adjust a speed of the print mechanism 50 so that the required power of the print mechanism 50 does not exceed an amount of power available from the power converter 60. For example, the speed of the print mechanism can be increased if the required power is less than the amount of power available from the power converter 60 (and/or the battery 80) and decreased if the required power is greater than the amount of power available from the power converter 60 (and/or the battery 80).

Further, in some embodiments, the various components of the printer can be operated at distinct times such that the required operating power is less than the power available from the power converter 60 and/or the power storage unit 80 (if present). In this regard, FIG. 6 illustrates a printhead 110, such as the printhead of the print mechanism 50. The printhead 110 includes a number of printhead elements 112, which are selectively energized during a printing operation to print at various positions along the printhead 110. A relatively small number of printhead elements 112 is shown in FIG. 6 for illustrative clarity, though it is appreciated that any number of printhead elements can be provided, and the printhead elements can be disposed in other configurations, on one or more printheads. Multiple printhead strobe lines 114a-114f are provided for controlling the operation of the printhead elements 112. That is, the printhead strobe lines are configured to separately control the operation of different groups of printhead elements, some or all of which may be energized during each line or printing or other print cycle. In particular, the first strobe line 114a controls a first group 112a of the printhead elements, a second strobe line 114b separately controls a second group 112b of the printhead elements, and the other strobe lines 114c-114f separately control third, fourth, fifth, and sixth groups 112c-112f of the printhead elements. During an operation of the printhead 110, the energizing of the strobe lines and, hence, the operation of the printhead elements, can be controlled, e.g., by the printer control and image generating circuitry 40, the print mechanism 50, or another circuit. In any case, the strobe lines 114a-114f can be individually and separately energized so that the different groups of printhead elements print in a successively timed manner.

For example, the printer control and image generating circuit can be configured to selectively activate or energize groups of the printhead elements at different times. In this way, the number of printhead elements energized at any particular time can be limited, thereby also limiting the total power or current required for energizing the printhead elements. For example, in one embodiment, the current required for energizing all of the printhead elements at once can exceed 10 amps. By successively operating the printhead elements at different times, the required current can be reduced to less than 2 amps. The timing and number of strobe lines and printhead elements that are energized at one time can be optimized according to the power available. Thus, even if the power converter 60 (with or without the power storage unit 80) is not configured to provide a total power that is required for simultaneously powering all of the printhead elements, the power available from the power converter 60 (and/or the power storage unit 80) can be used to perform a printing operation by successively activating the different groups of elements at different times, so that the power required at any particular time for energizing the select groups is less than the total power.

In an alternate embodiment, the storage controller 70 and the power storage unit 80 may be excluded if the direct power from the Ethernet or USB power transmission is sufficient to support the requirements of the printing process. Typically, the storage controller and power storage units are optional if the printing device is limited to low speed print operations and printing of images having limited data. In such embodiments, the print mechanism can be in direct electrical communication with a power converter, eliminating the need to accumulate and store power for higher powered print processing.

The invention is also embodied in various methods for supplying Ethernet or USB power to a printing device. FIGS. 4 and 4A provide for a flow diagram of a method for providing Ethernet or USB power, respectively, to at least a portion of a printer device, in accordance with an embodiment of the present invention. At step 200, 200A, a powered Ethernet network signal or USB signal having a power component is received at a printer device. In the case of an Ethernet powered printer device (FIG. 4), the Ethernet signal typically is received at a powered Ethernet port that is compliant with IEEE 802.3af standards for communication of power over Ethernet. At optional step 210, 210A, the Ethernet network signal or USB signal is separated into data components and power components and at step 220, 220A, the power component of the Ethernet or USB signal is converted to a supply voltage. After the power component has been converted to supply voltage, the supply voltage, at step 230, 230A, is communicated to a printer control and image generating circuit to provide the requisite operating power for the circuit. The Ethernet or USB power that is supplied to the printer control and image generating circuit may be the only power supplied to the circuit or it may serve as back-up power supplied to the circuit if power from a conventional source fails.

The method may additionally include optional step 240, 240A, of communicating the supply voltage to a print mechanism and/or printhead to provide the requisite operating power for the print mechanism and/or the printhead. The Ethernet or USB power that is supplied to the print mechanism and/or printhead may be the only power supplied to the print mechanism or printhead or it may serve as back-up power supplied to the print mechanism or printhead if power from a conventional source fails. Typically, Ethernet or USB power provided to a print mechanism or printhead is accumulated and stored prior to being provided to the print mechanism. Accumulation and storage of the power is typically necessary because the direct power from the Ethernet or USB source is limited. However, in certain printing devices that support lower speed printer and/or the printing of images having minimal data direct power from the Ethernet or USB source may be sufficient to support powering of the print mechanism and printhead absent power accumulation and storage.

FIGS. 5 and 5A illustrate an alternate method for providing Ethernet or USB power, respectively, to at least a portion of a printer device, in accordance with an embodiment of the present invention. At step 300, 300A, a powered Ethernet network signal or USB signal having a power component is received at a printer device. In the case of an Ethernet powered printer device (FIG. 5), the Ethernet signal typically is received at a powered Ethernet port that is compliant with IEEE 802.3af standards for communication of power over Ethernet. At optional step 310, 310A, the Ethernet network signal or USB signal is separated into data components and power components and at step 320, 320A, the power component of the Ethernet or USB signal is converted to a supply voltage. At step 330, 330A, the supply voltage is communicated to a power storage controller and, at step 340, 340A, the supply voltage is stored at a power storage unit. In this regard, the power storage controller serves as a battery charger that manages the power supplied to power storage unit or battery unit.

At optional step 350, 350A, voltage from the power storage unit is converted to operating supply voltage for a print mechanism. Typically, conversion is required if the power storage unit voltage is not compatible with the operating voltage of the print mechanism. At step 360, 360A, operating power is provided to the print mechanism in the form of supply voltage stored at the power storage unit. The storage unit Ethernet or USB power that is supplied to the print mechanism may be the only power supplied to the print mechanism or it may serve as back-up power supplied to the print mechanism if power from a conventional power source fails.

Thus, the present invention provides Ethernet or USB powered printing devices. In particular, the present invention provides for Ethernet or USB powered printers and methods of powering printers via the Ethernet or USB. The methods and devices support high speed printing and/or data intensive printing. Such high-speed and/or data intensive printing operations are able to be Ethernet or USB powered by providing for a power storage unit within the printer device that is able to provide for necessary energy bursts to support such higher powered processes. In addition, the present invention provides for devices and methods that allow for printers to operate with primary power provided by conventional power mains and for back-up or secondary power to be supplied by Ethernet or USB power. Additionally, the invention provides for Ethernet or USB powering, both primary and back-up, of the data and configuration settings in the printer control and image generating electronics. In the back-up power mode, the Ethernet or USB power insures that data and configurations are not lost during periods of main power outage.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A printing device capable of obtaining power from at least one of an Ethernet network transmission line and a USB connection, the printing device comprising:
   a power and data interface in communication with a port, the port being one of a standard powered Ethernet communication port that is compliant with IEEE 802.3af, and a four-pin USB communication port, the power and data interface being configured to separate data transmission from power transmission;
   a first power converter in communication with the power and data interface;
   a printer control and image generating circuit in data communication with the power and data interface and in communication with the first power converter, the printer control and image generating circuit configured to:
      determine an amount of required power for an upcoming operation of the printing device;
      determine, from communications with at least the first power converter, available power from the first power converter that is generated based on the power transmission that is available to the printing device for the upcoming operation; and
      determine printing control parameters based on the required power and the available power;
   a print mechanism in data communication with the printer control and image generating circuit configured to receive print control and image data from the printer control and image generating circuit;
   a power storage unit in communication with the print mechanism; and
   the power storage controller in communication with the first power converter and the power storage unit.

2. The printing device of claim 1, wherein the first power converter is in electrical communication with the print mechanism.

3. The printing device of claim 2, wherein power supplied to the power storage unit is limited to power being supplied by at least one of a standard Ethernet network transmission line that is compliant with IEEE 802.3af and a standard four-pin USB connection.

4. The printing device of claim 1, wherein power supplied to the printer control and image generating circuit is limited to power being supplied by at least one of a standard Ethernet network transmission line that is compliant with IEEE 802.3af and a standard four-pin USB connection.

5. The printing device of claim 1, wherein power supplied to the print mechanism is limited to power being supplied by the power storage unit.

6. The printing device of claim 1, further comprising a second power converter in communication with the power storage unit and the print mechanism, the second power converter configured to transform power storage potential to required print mechanism voltages.

7. The printing device of claim 1, wherein the first power converter is configured to receive power via the port up to a maximum power level of the port, and the power storage unit is configured to provide power to the print mechanism at a power level that is greater than the maximum power level of the port.

8. The printing device of claim 7, wherein the port has a maximum power level of 13 watts or less.

9. The printing device of claim 1, wherein the printer control and image generating circuit is configured to adjust the required power by changing the print mechanism's speed.

10. The printing device of claim 1, wherein the printer control and image generating circuit is configured to determine the required power according to a print density requirement for the upcoming operation.

11. The printing device of claim 1, wherein the first power converter is configured to provide a maximum power that is less than a total power required for energizing each of a plurality of printhead elements of the print mechanism, and wherein the printer control and image generating circuit is configured to selectively energize groups of the printhead elements at different times such that power required for energizing the groups selected is less than the total power.

12. The printing device of claim 1, further comprising an Alternating Current-Direct Current (AC-DC) converter in electrical communication with an electrical transmission line and in electrical communication with the first power converter.

13. The printing device of claim 12, wherein the electrical transmission line provides primary power to the printer control and image generating circuitry and at least one of a standard Ethernet network transmission line that is compliant with IEEE 802.3af and a standard four-pin USB connection provides secondary power to the printer control and image generating circuitry.

14. The printing device of claim 12, further comprising a second power converter in electrical communication with the AC-DC converter and the print mechanism.

15. The printing device of claim 14, wherein power supplied to the power storage unit is limited to power being supplied by the electrical transmission line.

16. The printing device of claim 12, wherein the electrical transmission line provides primary power to the print mechanism and at least one of a standard Ethernet network transmission line that is compliant with IEEE 802.3af and a standard four-pin USB connection provides secondary power to the print mechanism.

17. A printing device capable of obtaining power from at least one powered interface, the printing device comprising:

a power and data interface in communication with a standard powered communication port, the power and data interface being configured to separate data transmission from power transmission;

a first power converter in communication printer control and image generating circuit;

a controller in communication with first power converter, the controller configured to:
  determine an amount of required power for an upcoming operation of the printing device;
  determine, from communications with at least the first power converter, available power from the first power converter that is generated based on the power transmission that is available to the printing device for the upcoming operation for the upcoming operation; and
  determine printing control parameters based on the required power and the available power;

a power storage controller in communication with the first power converter;

a power storage unit in communication with the power storage controller; and a print mechanism configured to:
  communicate with the power storage unit; and
  receive electrical power from the power storage unit, wherein the power storage controller is configured to charge the power storage unit from the power transmission.

18. The printing device of claim 17, wherein power supplied to the print mechanism is limited to power being supplied by the power storage unit.

19. The printing device of claim 17, further comprising a second power converter in electrical communication with the power storage unit and the print mechanism, the second power converter configured to transform power storage potential to required print mechanism voltages.

20. The printing device of claim 17, wherein:
the first power converter is configured to receive power via the standard-powered communication port at a maximum power level of the standard-powered communication port, the standard-powered communication port is a standard port, and
the power storage unit is configured to provide power to the print mechanism at a power level that is greater than the maximum power level of the standard-powered communication port.

21. The printing device of claim 17, wherein the printing device is configured to adjust the required power by changing the print mechanism's speed.

22. The printing device of claim 17, wherein the printing device is configured to determine the required power according to a print density requirement for the upcoming operation.

23. The printing device of claim 17, wherein the first power converter is configured to provide a maximum power that is less than a total power required for energizing each of a plurality of printhead elements of the print mechanism, and wherein the printer device is configured to selectively energize groups of the printhead elements at different times such that power required for energizing the groups selected is less than the total power.

24. A printing device capable of obtaining power from at least one of an Ethernet network transmission line and a USB connection, the printing device comprising:

a power and data interface in communication with at least one of a standard powered Ethernet communication port that is compliant with IEEE 802.3af and a standard four-pin USB communication port, the power and data interface being configured to separate data transmission from power transmission;

a first power converter in communication with the power and data interface;

a printer control and image generating circuit in data communication with the interface and in communication with the first power converter, the printer control and image generating circuit configured to:
- determine an amount of required power for an upcoming operation of the printing device;
- determine, from communications with at least the first power converter, available power from the first power converter that is generated based on the power transmission that is available to the printing device for the upcoming operation; and
- determine printing control parameters based on the required power and the available power, wherein the printing control parameters are used to generate print control and image data;

an Alternating Current-Direct Current (AC-DC) converter in communication with an electrical transmission line and in communication with the first power converter; and a print mechanism in data communication with the printer control and image generating circuit and in communication with the AC-DC converter.

25. The printing device of claim 24, wherein the electrical transmission line provides primary power to the printer control and image generating circuitry and the at least one of the standard powered Ethernet communication port and the standard four-pin USB communication port provides secondary power to the printer control and image generating circuitry.

26. The printing device of claim 24, further comprising a second power converter in electrical communication with the AC-DC converter and the print mechanism.

27. A method for providing at least one of Ethernet power and USB power to at least a portion of a printer device, the method comprising the steps of:
- receiving, at a standard powered communication port of a printer device, a signal having a voltage component, the signal being at least one of a standard Ethernet network signal that is compliant with IEEE 802.3af and a standard USB signal;
- converting, by a first power converter, the voltage component of the signal to a supply voltage;
- storing the supply voltage in a power storage unit;
- determining an amount of required power for an upcoming operation of the printing device;
- determining available power to the printing device;
- determining, from communications with at least the first power converter, available power from the first power converter that is generated based on the voltage component of the signal that is available to the printing device for the upcoming operation;
- determining printing control parameters based on the required power and the available power; and
- providing operating power to a printer control and image generating circuit in the form of the supply voltage.

28. The method of claim 27, further comprising the step of segregating the voltage component from a data component of the signal.

29. The method of claim 27, wherein the step of providing operating power to the printer control and image generating circuit in the form of the supply voltage further provides for providing sole operating power to the printer control and image generating circuit in the form of the supply voltage.

30. The method of claim 27, wherein the step of providing operating power to the printer control and image generating circuit in the form of the supply voltage further provides for providing back-up operating power to the printer control and image generating circuit in the form of the supply voltage.

31. The method of claim 27, further comprising the step of providing operating power to a print mechanism in the form of the supply voltage.

32. The method of claim 31, wherein the step of providing operating power to the print mechanism in the form of the supply voltage further provides for providing sole operating power to the print mechanism in the form of the supply voltage.

33. The method of claim 31, wherein the step of providing operating power to the print mechanism in the form of the supply voltage further provides for providing back-up operating power to the print mechanism in the form of the supply voltage.

34. The method of claim 27, wherein the providing operating power to the printer control and image generating circuit comprises providing the operating power being greater than a maximum power of the signal received at the printer device.

35. The method of claim 27 further comprising adjusting the required power by changing the print mechanism's speed.

36. The method of claim 27, wherein said determining the required power comprises determining the required power according to a print density requirement for the upcoming operation.

37. The method of claim 27, wherein said providing operating power to the printer control and image generating circuit comprises providing the operating power at a level less than a total power required for operating each of a plurality of printhead elements of the printer device, and further comprising selectively energizing groups of the printhead elements at different times such that the power required for energizing the select groups is less than the total power.

38. A method for providing at least one of Ethernet power and USB power to at least a portion of a printer device, the method comprising the steps of:
- receiving, at a standard powered communication port of a printer device, a signal having a voltage component, the signal being at least one of a standard Ethernet network signal that is compliant with IEEE 802.3af and a standard USB signal;
- converting, by a first power converter, the voltage component of the signal to a supply voltage;
- providing the supply voltage to a power storage controller;
- storing the supply voltage at a power storage unit;
- determining an amount of required power for an upcoming operation of the printing device;
- determining, from communications with at least the first power converter, available power from the first power converter that is generated based on the voltage component of the signal that is available to the printing device for the upcoming operation;
- determining printing control parameters based on the required power and the available power; and
- providing operating power to the print mechanism in the form of the supply voltage stored at the power storage unit.

39. The method of claim 38, wherein the step of providing operating power to the print mechanism in the form of the supply voltage stored at the power storage unit further comprises providing sole operating power to the print mechanism in the form of supply the voltage stored at the power storage unit.

40. The method of claim 38, wherein the step of providing operating power to the print mechanism in the form of the supply voltage stored at the power storage unit further comprises providing back-up operating power to the print mechanism in the form of the supply voltage stored at the power storage unit.

41. The method of claim 38 further comprising the step of converting the supply voltage stored at the power storage unit to a print mechanism operating voltage.

42. The method of claim 38, wherein providing the operating power comprises providing the operating power at a power level greater than a maximum power of the signal received at the standard powered communication port.

43. The method of claim 42, wherein receiving the signal comprises receiving 13 watts or less of power.

44. The method of claim 38 further comprising adjusting the required power by changing the print mechanism's speed.

45. The method of claim 44, wherein said determining the required power comprises determining the required power according to a print density requirement for the printing operation.

46. The method of claim 38, wherein said providing the operating power comprises providing the operating power at a level less than a total power required for operating each of a plurality of printhead elements of the print mechanism, and further comprising selectively energizing groups of the printhead elements at different times such that the power required for energizing the select groups is less than the total power.

47. A printing device configured to adjust the speed of a printing operation according to a power required for performing the printing operation, the printing device comprising:
 a port, the port being one of a standard powered Ethernet communication port that is compliant with IEEE 802.3af and a standard four-pin USB communication port;
 a power storage unit;
 a power storage controller in communication with the power storage unit, wherein the power storage controller is configured to charge the power storage unit from power received at the port;
 a power converter configured to receive power from at least one of the port and the power storage unit and to convert the power received from the port to a supply voltage;
 the print mechanism in communication with the power converter and configured to receive at least some of the power from the power converter at the supply voltage; and
 a controller in communication with the print mechanism, wherein the controller is configured to:
  determine a required power for a printing operation of the print mechanism;
  determine, from communications with at least the first power converter, available power from the first power converter that is available to the printing device for the printing operation; and
  adjust a speed of the print mechanism according to the required power and the available power, such that the required power does not exceed the available power from at least one of the power converter and the storage unit to the print mechanism.

48. The printing device of claim 47, wherein the controller is configured to determine the required power according to a print density requirement for the printing operation.

49. The printing device of claim 48, wherein the controller is configured to determine the print density requirement for the upcoming operation according to a number of print elements required for performing the upcoming operation.

50. The printing device of claim 47, wherein the controller is configured to monitor the required power of the print mechanism during operation of the print mechanism and adjust the required power by increasing the speed of the print mechanism if the required power is less than the amount of the power available and decreasing the speed of the print mechanism if the required power is greater than the amount of power available.

* * * * *